United States Patent
Joo

(10) Patent No.: US 11,754,163 B1
(45) Date of Patent: Sep. 12, 2023

(54) STRAIN WAVE GENERATOR FOR HARMONIC REDUCER

(71) Applicant: C&M ROBOTICS CO., LTD, Seoul (KR)

(72) Inventor: Sang Wan Joo, Gyeonggi-do (KR)

(73) Assignee: C&M ROBOTICS CO., LTD., Seoul (KR)

( * ) Notice: Subject to any disclaimer, the term of this patent is extended or adjusted under 35 U.S.C. 154(b) by 0 days.

(21) Appl. No.: 17/655,472

(22) Filed: Mar. 18, 2022

(51) Int. Cl.
- *F16H 49/00* (2006.01)
- *F16H 53/02* (2006.01)
- *F16H 57/12* (2006.01)

(52) U.S. Cl.
CPC ......... *F16H 49/001* (2013.01); *F16H 53/025* (2013.01); *F16H 57/12* (2013.01)

(58) Field of Classification Search
CPC ...... F16H 49/001; F16H 53/025; F16H 53/02; F16H 53/00; F16H 57/12
See application file for complete search history.

(56) References Cited

U.S. PATENT DOCUMENTS

| | | | | |
|---|---|---|---|---|
| 2,230,902 A | * | 2/1941 | Overbey | F16H 55/12 74/448 |
| 3,285,099 A | * | 11/1966 | Parks, Jr. | F16C 19/50 74/640 |
| 3,415,143 A | * | 12/1968 | Ishikawa | F16H 49/001 74/640 |
| 3,667,320 A | * | 6/1972 | Robinson | F16H 49/001 74/640 |
| 4,111,064 A | * | 9/1978 | Purcell | F16H 55/12 74/447 |
| 4,909,098 A | * | 3/1990 | Kiryu | F16H 49/001 384/532 |
| 6,109,136 A | * | 8/2000 | Dold | F16H 49/001 239/227 |
| 6,273,211 B1 | * | 8/2001 | Engels | B62D 6/10 180/444 |
| 2018/0259054 A1 | * | 9/2018 | Kobayashi | F16H 49/001 |
| 2019/0003567 A1 | * | 1/2019 | Genovese | F16C 33/60 |

FOREIGN PATENT DOCUMENTS

WO    WO-0166974 A1 *  9/2001  ............. F16H 25/06

* cited by examiner

*Primary Examiner* — Daniel D Yabut
(74) *Attorney, Agent, or Firm* — Schmeiser, Olsen & Watts LLP

(57) ABSTRACT

Proposed is a strain wave generator for a harmonic reducer, the strain wave generator including: a cam formed with a plurality of segmented cams on a long-diameter side and the same number of segmented cams on a short-diameter side alternately abutted along a circumferential direction, wherein each of the segmented cams on a long-diameter side has an outer circumference surface of a certain cylindrical surface of a small radius, each of the segmented cams on a short-diameter side has an outer circumference surface of a certain cylindrical surface of a large radius, and the cylindrical surface of each of the segmented cams on a long-diameter side and the cylindrical surface of each of the segmented cams on a short-diameter side, abutted each other, have a common tangent line at a meeting point thereof.

10 Claims, 13 Drawing Sheets

STRAIN WAVE GENERATOR FOR HARMONIC REDUCER

BACKGROUND OF THE INVENTION

Field of the Invention

The present disclosure relates to a strain wave generator, which is a component of a harmonic reducer mainly applied to a joint of an industrial robot and, more particularly, to a strain wave generator improved to allow a phenomenon of occurrence of backlash or a decrease in frictional torque to be prevented.

DESCRIPTION OF THE RELATED ART

In general, a harmonic reducer 10 applied to an industrial robot transmits high-speed rotation of a servomotor to an output shaft at a high reduction ratio of 1:30 to 1:320. As shown in FIG. 1, as an elliptical strain wave generator 11 rotates, points, at which a flexspline 12 surrounding the elliptical strain wave generator 11 meshes with an outer circular spline 13, move along a circumferential direction, and a key point to establishing speed reduction is in allowing such points to be rotated in an opposite direction by a difference of the number of teeth.

However, according to the harmonic reducer of the same principle, there is a problem in that backlash occurs due to a space between teeth due to a design and processing error of the teeth and wear of parts such as bearings.

In particular, the strain wave generator 11 has an elliptical shape cam, so there are problems that precise processing of the outer shape is quite difficult, mass production is difficult, and the production cost is also high. In addition, there is a problem that fairly expensive equipment is required for precise measurement of the cam shape of the strain wave generator 11. Furthermore, the flexspline 12 has to be assembled with the strain wave generator 11 in an elastically deformed state, so there are problems that assembly skill is required, and productivity is low.

On the other hand, in order to solve the above problems, the applicant has proposed Korean Patent No. 10-2303050 (issue date: Sep. 16, 2021) and Korean Patent No. 10-2345641 (issue date: Dec. 31, 2021) and the disclosure disclosed in Korean Patent Publication No. 10-2021-0155587 (publication date: 2021 Dec. 23).

A key point of the above patents and disclosure is to solve a tooth design and a backlash problem resulting therefrom by converting a coupling between the flexspline 22 and the circular spline 23 into a face-to-face friction structure as shown in FIG. 2.

However, even in such a case, there still exists a difficulty of machining a cam-type strain wave generator 21. In particular, when the vertical surface pressure V by the strain wave generator 21 is not sufficiently transmitted to the flexspline 22 side due to machining error, friction surface wear, bearing wear, and the like, frictional force f with the circular spline 23 is lowered, so that sufficient friction torque is not generated, so the performance as a reducer may not be guaranteed.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and a first objective of the present disclosure is to provide an improved strain wave generator to facilitate shape processing.

A second objective of the present disclosure is to provide a strain wave generator capable of preventing backlash from occurring in the case of a toothed speed reducer and preventing transmitted vertical surface pressure from decreasing in the case of a toothless speed reducer.

In order to achieve the above objective, there may be provided a strain wave generator for a harmonic reducer, the strain wave generator including: a cam formed with a plurality of segmented cams on a long-diameter side and the same number of segmented cams on a short-diameter side alternately abutted along a circumferential direction, wherein each of the segmented cams on a long-diameter side has an outer circumference surface of a certain cylindrical surface of a small radius, each of the segmented cams on a short-diameter side has an outer circumference surface of a certain cylindrical surface of a large radius, and the cylindrical surface of each of the segmented cams on a long-diameter side and the cylindrical surface of each of the segmented cams on a short-diameter side, abutted each other, have a common tangent line at a meeting point thereof.

Here, on the cylindrical surfaces of the segmented cams on a long-diameter side and the segmented cams on a short-diameter side, V grooves may be formed to be connected to each other in the circumferential direction to form a single track, and a plurality of balls may be seated along the track.

Alternatively, on the cylindrical surfaces of the segmented cams on a long-diameter side and the segmented cams on a short-diameter side, a plurality of rollers may be in rolling contact with the cylindrical surfaces.

At this time, at opposite sides on the cylindrical surface of the segmented cams on a long-diameter side and the segmented cams on a short-diameter side, barrier ribs configured to guide the rollers not to deviate from the track may be formed to be connected to each other in the circumferential direction to form a single track, and the plurality of rollers may be seated along the track.

Alternatively, on the cylindrical surface of the plurality of segmented cams on a long-diameter side and on the cylindrical surface of the plurality of segmented cams on a short-diameter side, one flexible bearing inner ring may be coupled, and a plurality of balls or rollers may be seated on the flexible bearing inner ring.

At this time, on the plurality of balls or rollers, one flexible bearing outer ring may be coupled.

On the other hand, at an inner side of the plurality of segmented cams on a long-diameter side and segmented cams on a short-diameter side, a central shaft may be installed, between an inner circumference surface of the plurality of segmented cams on a long-diameter side and segmented cams on a short-diameter side and an outer circumference surface of the central shaft, tapered grooves inclined in an axial direction may be formed to extend in a circumferential direction, a plurality of balls may be inserted into the tapered grooves, respectively, and by pressing the plurality of balls in the axial direction through a lock nut coupled to an outer circumference surface of the central shaft, positions of the plurality of segmented cams on a long-diameter side and segmented cams on a short-diameter side may be finely adjusted outward.

At this time, each of the segmented cams on a long-diameter side may have a long hole formed to extend in a circumferential direction adjacent to the cylindrical surface thereof and may exert pressing force in a radial direction through an elastic deformation in which a width of the long hole may be narrowed by the plurality of balls pressed in the axial direction.

Alternatively, at an inner side of the plurality of segmented cams on a long-diameter side and segmented cams on a short-diameter side, a central shaft is installed, tapered grooves inclined in an axial direction may be formed on inner circumference surfaces of the plurality of segmented cams on a long-diameter side and segmented cams on a short-diameter side, respectively, a ball may be inserted into each of the tapered grooves, and by pressing the plurality of balls in the axial direction through a lock nut coupled to an outer circumference surface of the central shaft, positions of the plurality of segmented cams on a long-diameter side and segmented cams on a short-diameter side may be finely adjusted outward.

At this time, a flange, configured to support the plurality of segmented cams on a long-diameter side and segmented cams on a short-diameter side in the axial direction, may be formed to extend in a radial direction from one end of the central shaft, and the flange may be elastically deformed in the axial direction by the plurality of segmented cams on a long-diameter side and segmented cams on a short-diameter side pressed by the balls, thereby preventing excessive force from being transmitted in the radial direction through the plurality of segmented cams on a long-diameter side and segmented cams on a short diameter side.

As described above, according to a strain wave generator according to the present disclosure, each of outer circumference surfaces of segmented cams on a long-diameter side and segmented cams on a short-diameter side has a cylindrical surface of a certain radius, so there is an advantage that the outer circumference surface of the segmented cam can be easily, quickly, and accurately machined by lathing or grinding by simple rotation.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 3:
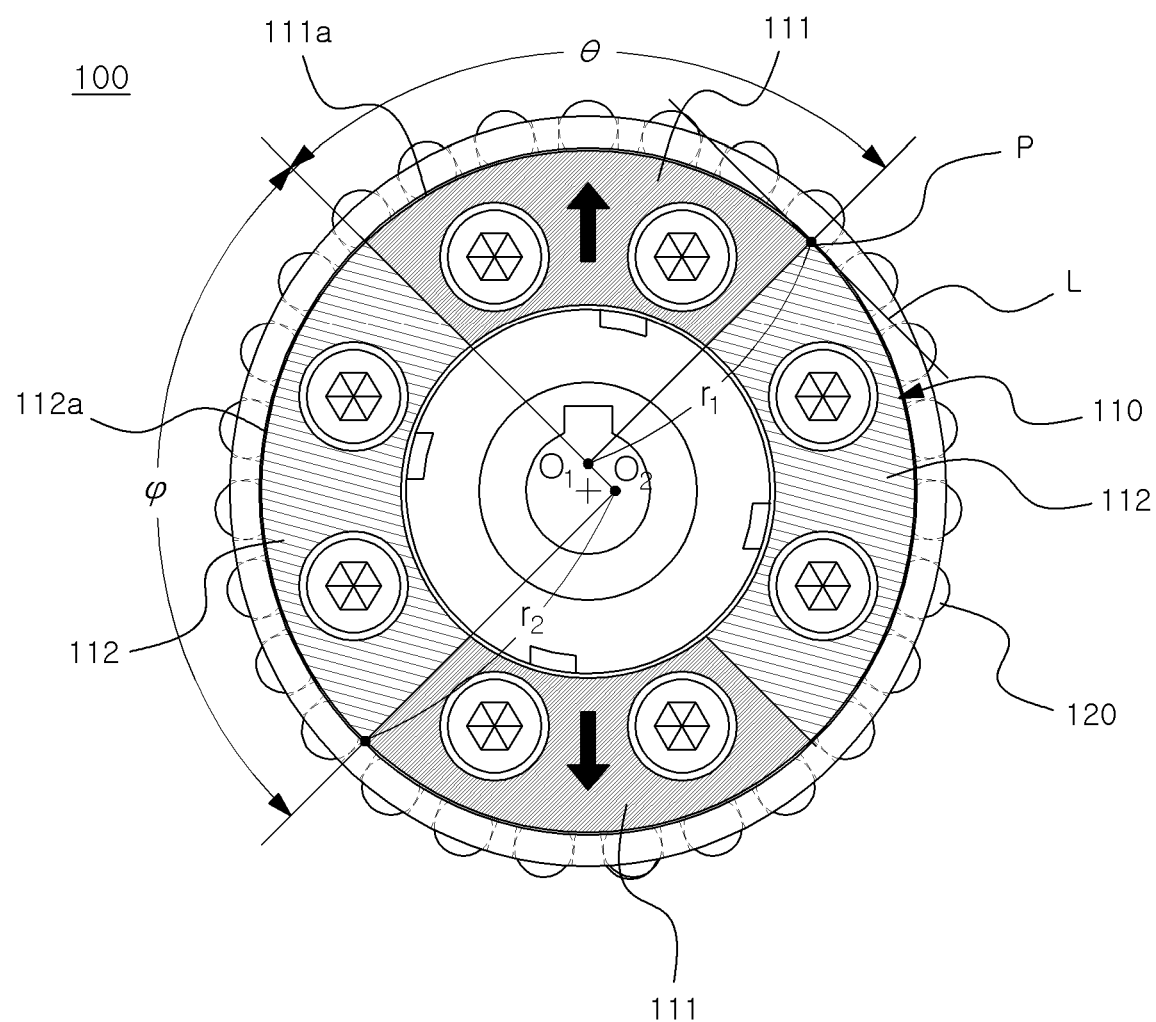
FIG. 3 is a front view of a strain wave generator according to an embodiment of the present disclosure.

As shown in FIG. 3, a strain wave generator 100 according to an embodiment of the present disclosure includes a cam 110 formed by two segmented cams 111 on a long-diameter side and two segmented cams 112 on a short-diameter side 112 alternately abutted in a circumferential direction.

The segmented cams 111 on a long-diameter side and the segmented cams 112 on a short-diameter side 112 each have cylindrical surfaces 111a and 112a of a constant radius, that is, a cylindrical surface of a regular circle, wherein each of the segmented cams 111 on a long-diameter side has a cylindrical surface 111a of a small radius r1, and each of the segmented cams 112 on a short-diameter side 112 has a cylindrical surface 112a of a large radius r2.

At this time, the segmented cams 111 on a long diameter side and the segmented cams 112 on a short diameter side have centers O1 and O2, respectively, different from each other and are configured to have a common tangent line L at a point P where the cylindrical surfaces 111a and 112a meet with each other, whereby the cylindrical surface 111a and cylindrical surface 112a are allowed to be smoothly connected. In this way, it is possible to implement one outer circumference surface of the cam consisting of four segmented cams 111 and 112.

Figure 4:
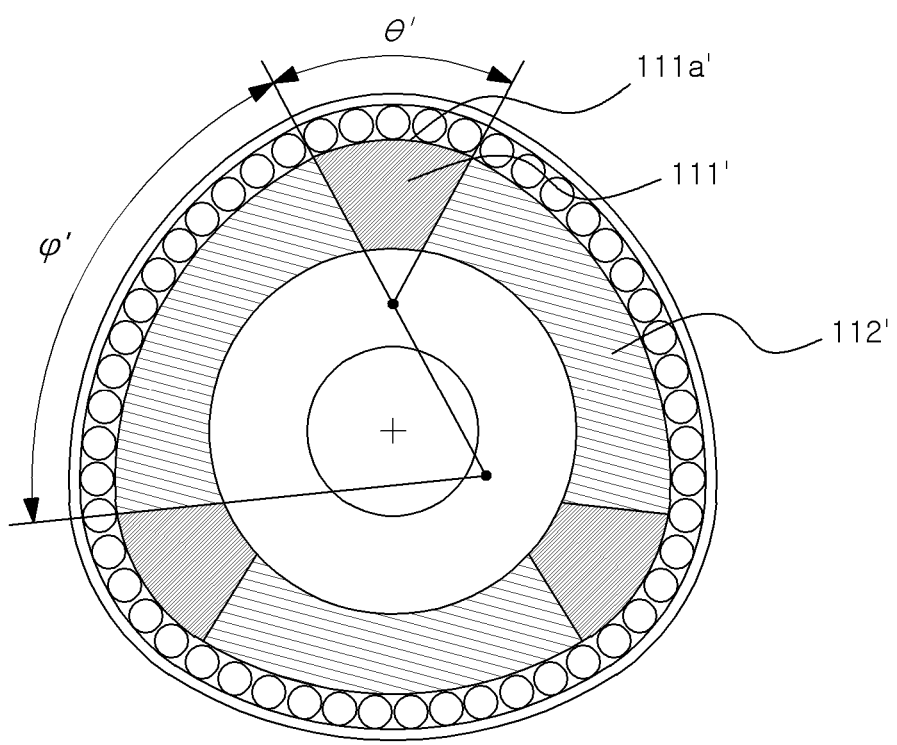
FIG. 4 is a front view showing a modified example of the strain wave generator of FIG. 3.

A cam using a combination of segmented cams may be implemented by a combination of six segmented cams as shown in FIG. 4, that is, three segmented cams 111 on a long-diameter side' and three segmented cams 112' on a short-diameter side. In addition, the same principle may be applied to eight segmented cams and the like.

Figure 1:
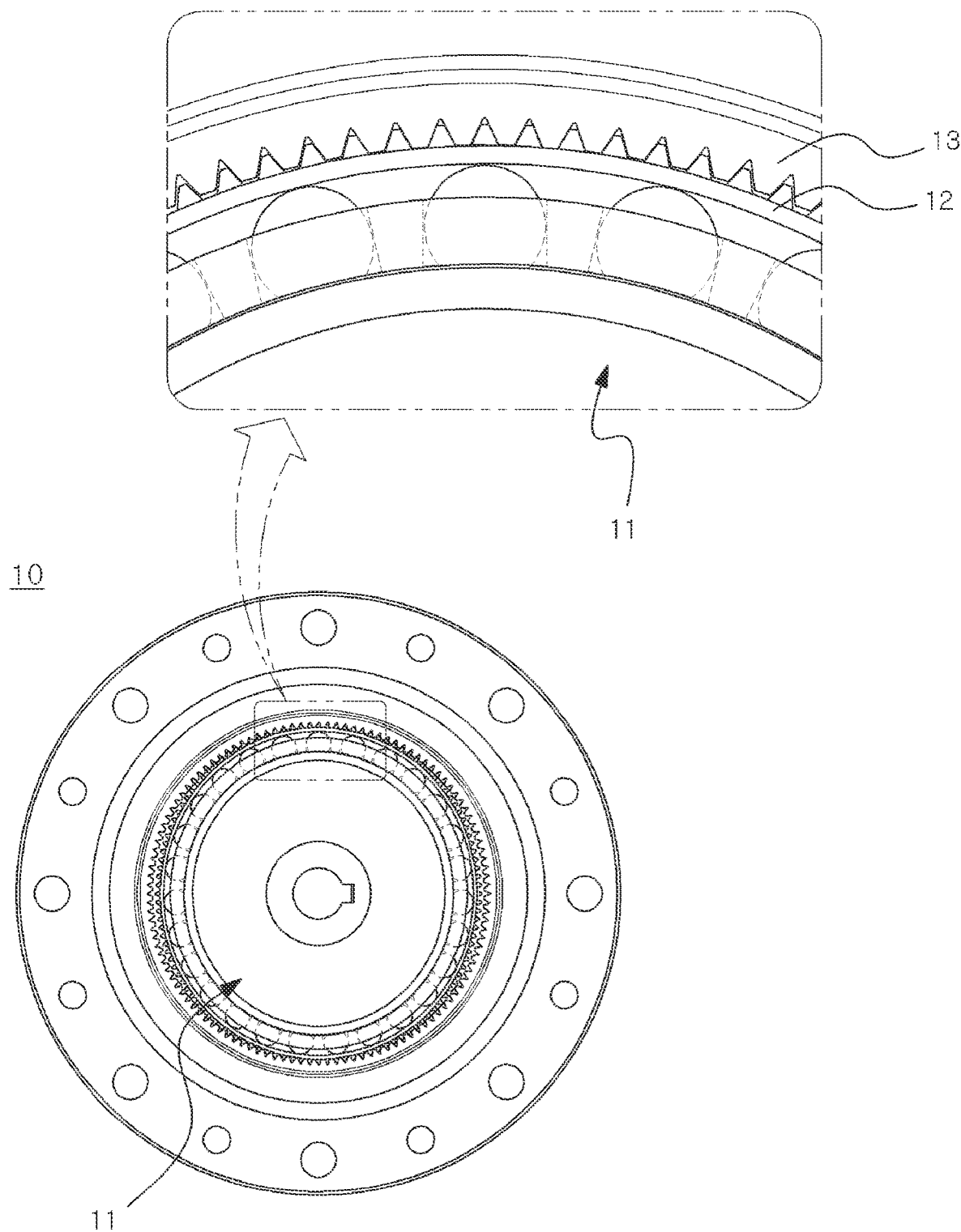
FIG. 1 shows a front view and a detailed view of a toothed harmonic reducer according to a related art.
Figure 2:
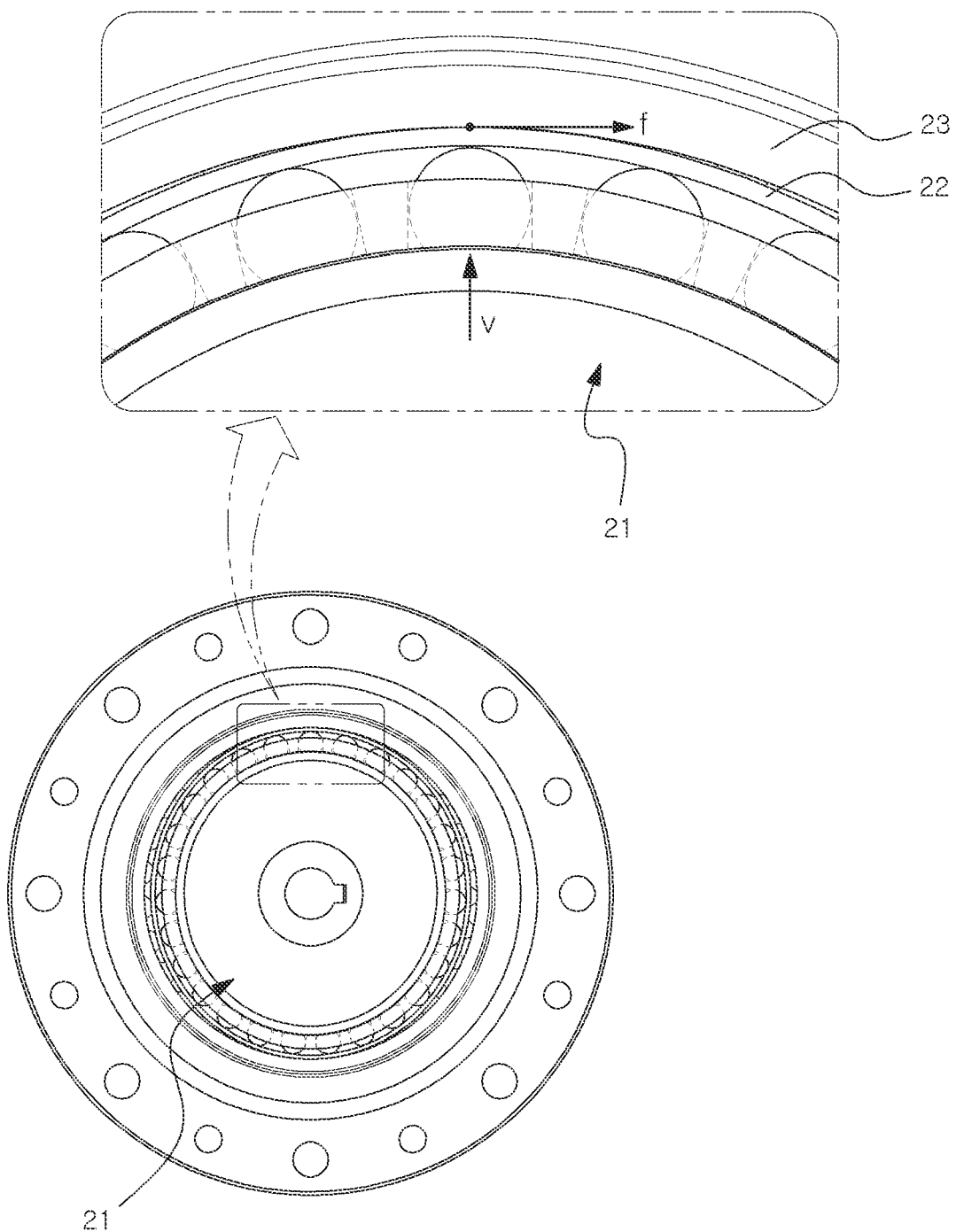
FIG. 2 shows a front view and a detailed view of a toothless type harmonic reducer according to the prior art.

In addition, in the combination of all the segmented cams, each of the cylindrical surfaces 111a and 111a' of the segmented cams 111 on a long-diameter side and 111', respectively, becomes an acting surface with respect to the outer flexspline (see 12 in FIG. 1) or the circular spline 13.

Figure 5:
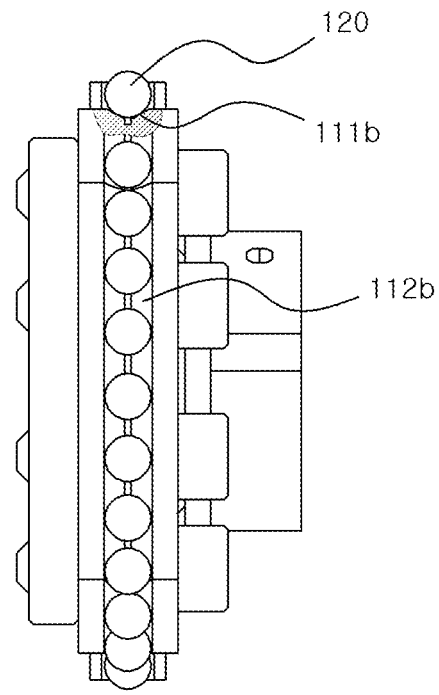
FIG. 5 is a left side view of the strain wave generator of FIG. 3.

A plurality of balls 120 is configured to be in rolling contact along the cylindrical surfaces 111a and 112a of the segmented cams 111 the long diameter side and the segmented cams 112 on a short diameter side, respectively. To this end, V grooves 111b and 112b are formed to be connected in a circumferential direction as shown in FIG. 5 so that the balls 120 may be seated along the track.

Figure 6:
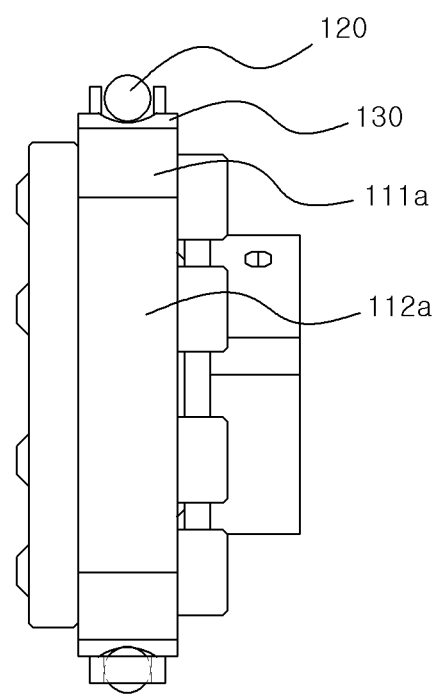
FIGS. 6 to 8 are left side views showing modified examples of the strain wave generator of FIG. 5.
Figure 7:
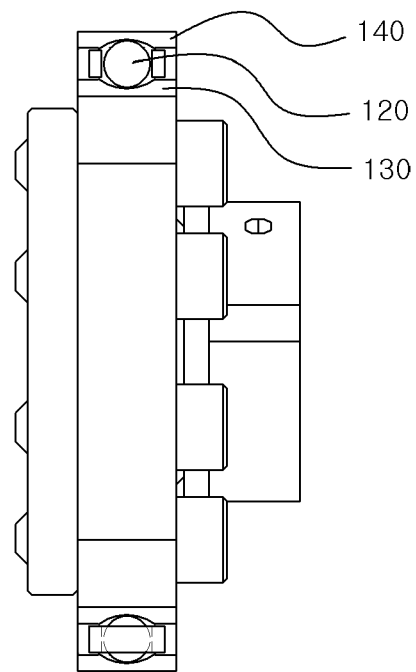

Alternatively, as shown in FIG. 6, a configuration, in which a flexible bearing inner ring 130 is coupled on the cylindrical surfaces 111a and 112a so that the balls 120 are seated thereon, may be used, or as shown in FIG. 7, a configuration, in which a flexible bearing outer ring 140 is additionally coupled on the balls, may be used. Meanwhile, the balls 120 and the flexible bearing inner and outer rings 130 and 140 in FIGS. 6 and 7 may be replaced with rollers (not shown) and flexible bearing inner and outer rings (not shown) corresponding to the rollers.

Figure 8:
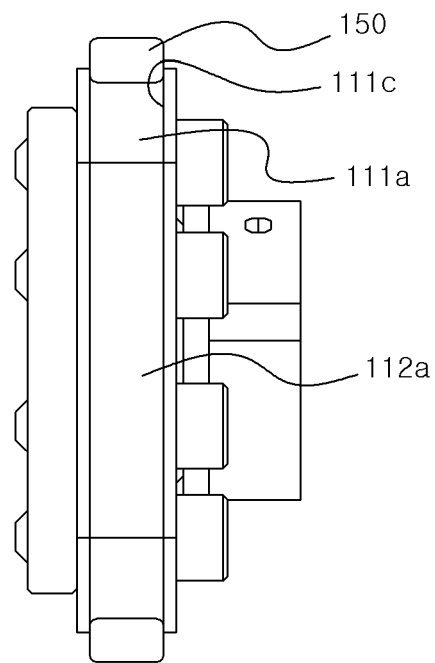

As another modification, as shown in FIG. 8, a configuration, in which a plurality of rollers 150 is in rolling contact on the cylindrical surfaces 111a and 112a of the segmented cams 111 on a long-diameter side and the segmented cams 112 on a short-diameter side 112, respectively, may be used.

To this end, barrier ribs 111c of a predetermined width are formed to be connected in the circumferential direction on the cylindrical surfaces 111a and 112a for smooth orbital circulation of the rollers 150, whereby the rollers 150 are allowed also to be seated on the orbit of the cylindrical surfaces 111a and 112a without deviating therefrom.

Figure 9:
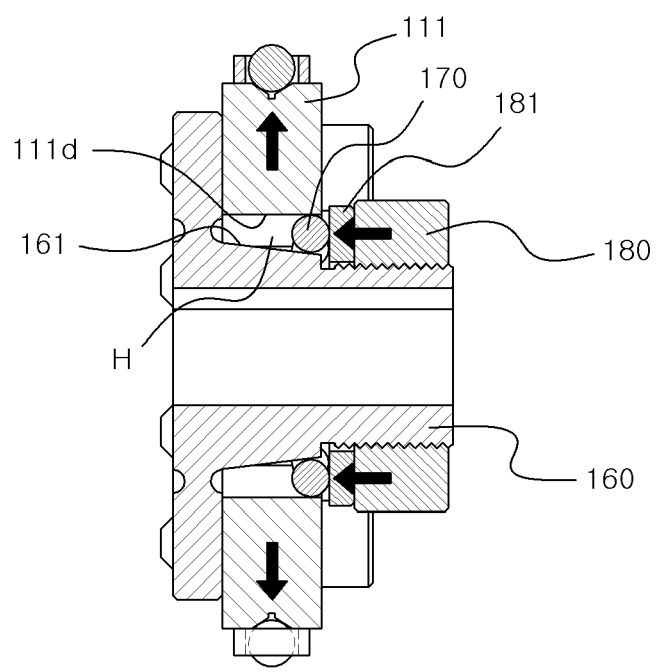
FIG. 9 is a sectional view of FIG. 5.

On the other hand, in consideration of a processing error of the strain wave generator 100, an installation error of the reducer, an occurrence of wear due to use, and the like, balls 170 are interposed between the segmented cams 111 and 112 and a central axis 160 of same as shown in FIG. 9 and configured to be able to fine-tune positions in a radial direction of the segmented cam 111 or 112.

Specifically, an outer circumference surface of the central shaft 160 foams the inclined tapered surface 161 so that a tapered groove H is formed between the inner circumference surface 111d of the segmented cam 111 or 112 and the outer circumference surface of the central shaft 160, thereby allowing the ball 170 to be inserted inward. In addition, a lock nut 180 may be screwed to the outer circumference surface of the central shaft 160 to allow the ball 170 to be pressed into the tapered groove H through a washer 181 as a medium. Accordingly, a position of the segmented cam 111 or 112 may be adjusted to the outside, that is, in the radial direction by the ball 170 to be inserted into the tapered groove H.

Figure 10:
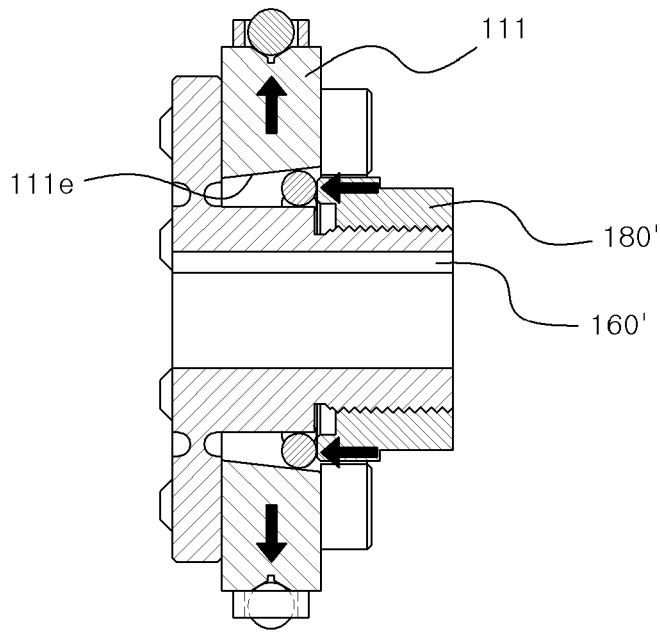
FIG. 10 is a sectional view showing a modified example of FIG. 9.

As shown in FIG. 10, a tapered groove H may be formed by allowing the outer circumference surface of the central shaft 160' to be a circumference surface of a certain radius and the inner circumference surface 111e of the segmented cam 111 or 112 to be foamed in a tapered surface.

Figure 11:
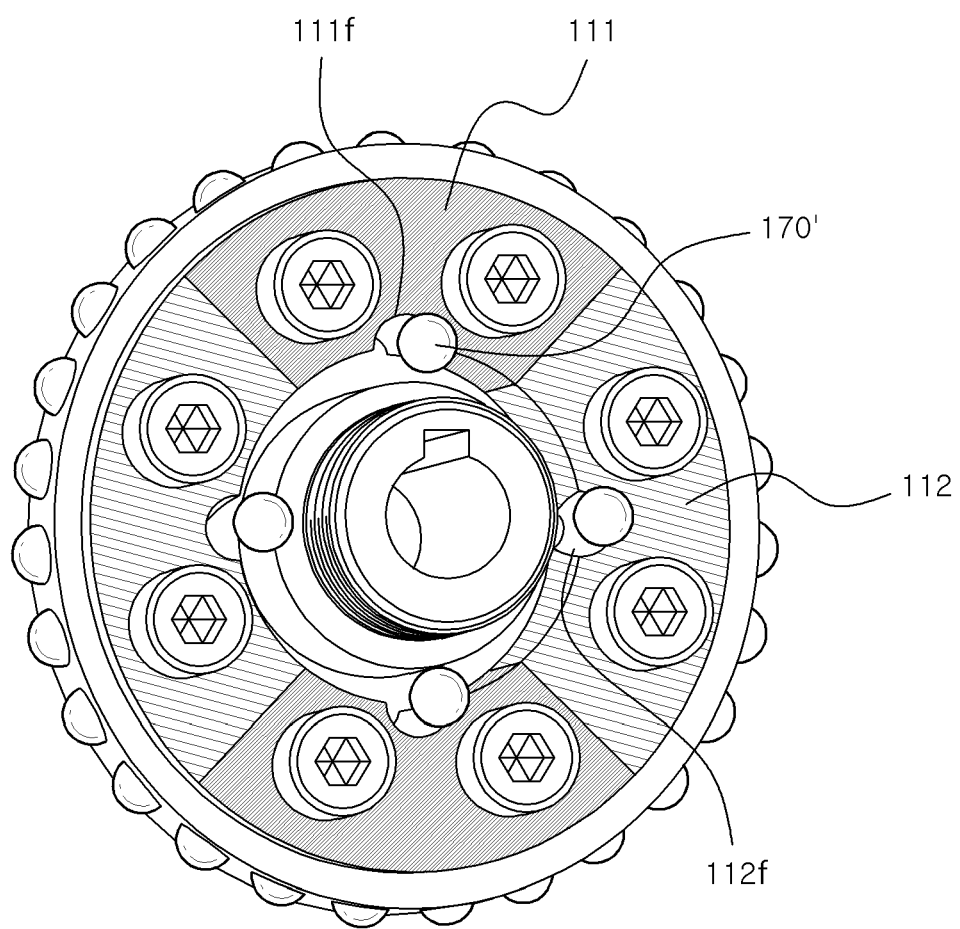
FIG. 11 is a partially exploded perspective view showing another modified example of FIG. 10.

Alternatively, as shown in FIG. 11, a configuration may be used such that tapered grooves 111f and 112f inclined in an axial direction are formed on the inner circumference surfaces of the segmented cams 111 and 112 to allow a ball 170' to be inserted into each thereof, whereby the balls may be pressed with a lock nut (see 180' in FIG. 10).

Figure 12:
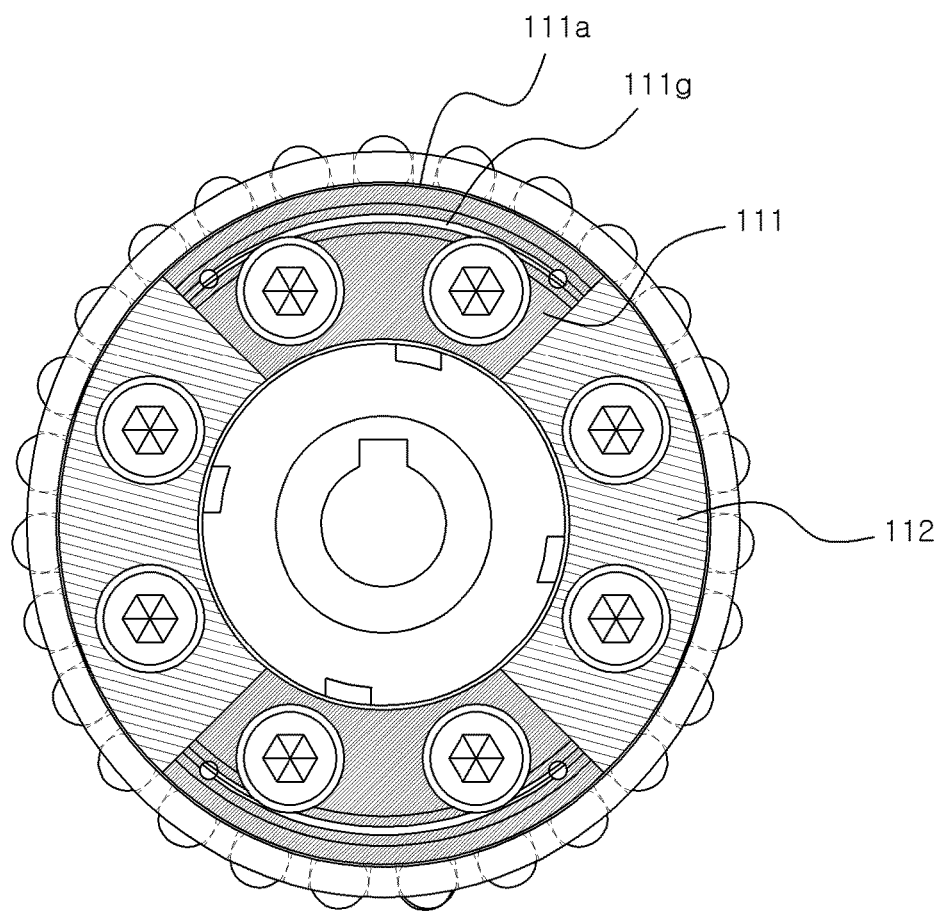
FIG. 12 is a front view of a strain wave generator according to another embodiment of the present disclosure.
Figure 13:
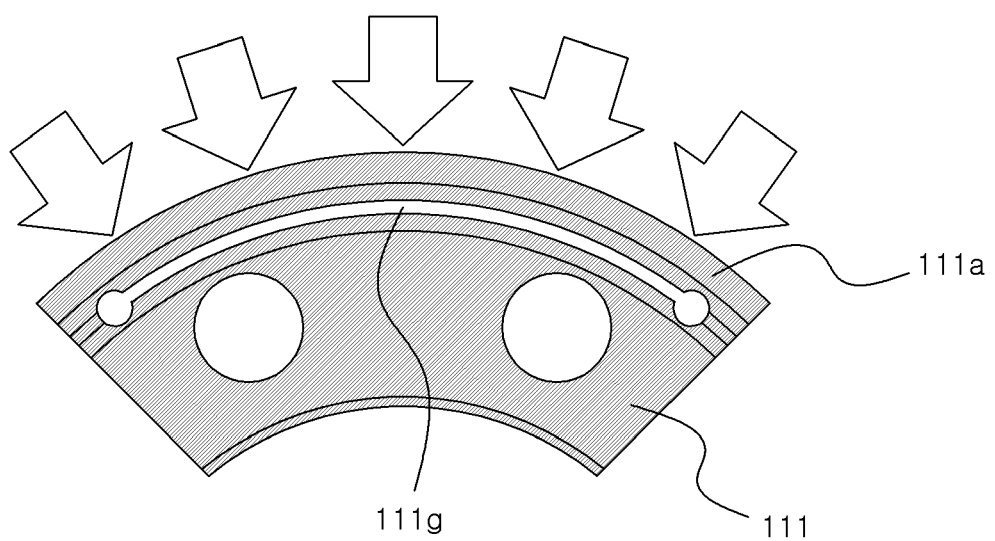
FIG. 13 is a front view explaining an elastic part of each of segmented cams on a long-diameter side of FIG. 12.
Figure 14:
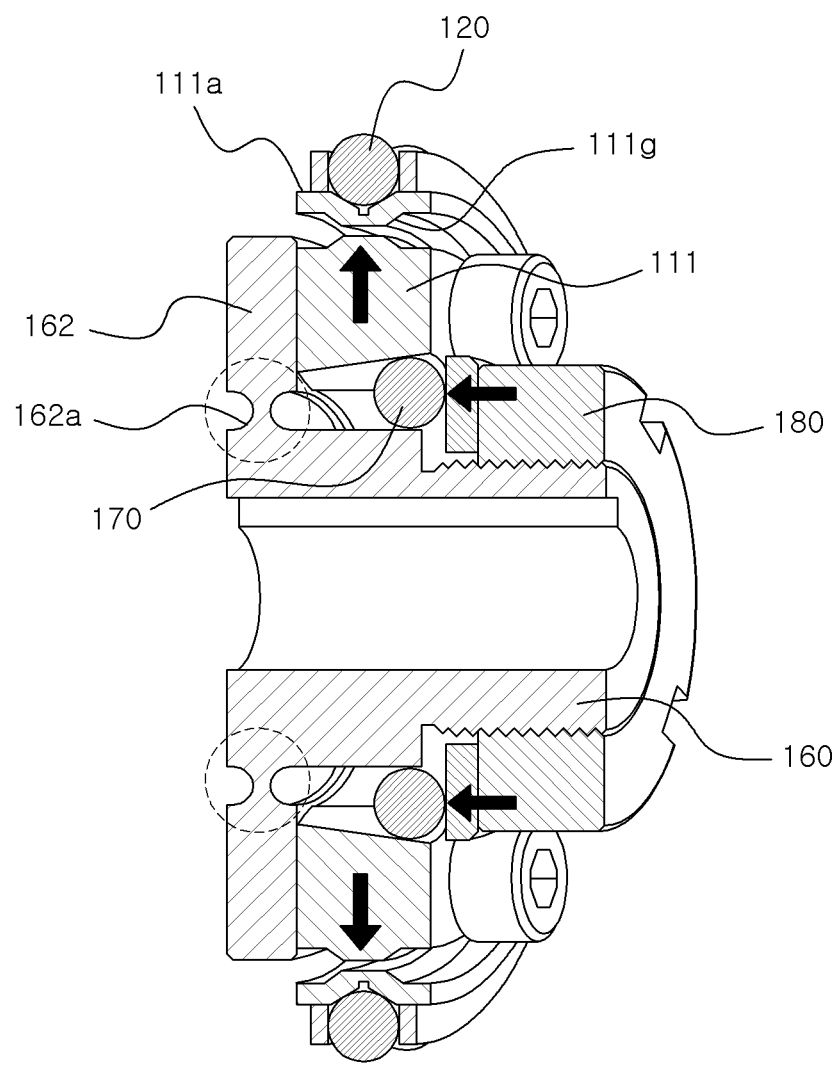
FIG. 14 is a perspective view showing a cut state of the strain wave generator of FIG. 12.

On the other hand, as a configuration that may automatically compensate for a case in which vertical surface pressure is lowered or backlash occurs, due to wear of the ball 120 or the roller and its bearing circulating on the cylindrical surfaces 111a and 112a of the segmented cams 111 and 112 in FIG. 3 and/or due to wear of the flexspline (see 12 in FIG. 1) or circular spline (see 13 in FIG. 1) coupled to an outer side of the strain wave generator 100, a long hole 111g formed to extend in a circumferential direction at an inner point adjacent to the cylindrical surface 111a of each of the segmented cams 111 on a long-diameter side may be provided as shown in FIGS. 12 to 14.

In FIG. 14, each of the segmented cams 111, which receive force outwardly by the balls 170 pressed by the lock nut 180, becomes to exert pressing force on the ball 120 that is on the circumference surface 111a through elastic deformation in which the width of the long hole 111g is narrowed. Accordingly, the ball 120 becomes to be more closely contacted with the outer flexspline (see 12 of FIG. 1) and the circular spline 13, whereby a decrease in the vertical surface pressure transmitted to the splines or the occurrence of backlash may be prevented.

At this time, a notch 162a is formed at a base end of a flange 162 extending radially from one end of the central shaft 160 to support the segmented cams 111 and 112, so that when the force pressed by the lock nut 180 is excessive to the ball 170, the flange 162 may be elastically deformed in the axial direction (left direction in FIG. 14), thereby preventing excessive force from being transmitted to the segmented cams 111 and 112 as it is.

In the present embodiment, a configuration in which the notch 162a is formed for axial elastic deformation of the flange 162 is used, but the present disclosure is not limited thereto. In other words, various other methods, such as a method to make elastic deformation more easily by reducing the thickness of the flange 162 and the like, may be applied, thereby replacing the configuration.

In addition, the configuration in which the flange 160 is elastically deformed in such a way is applicable to a structure as shown in FIG. 10 in which the long hole 111g is not formed in the segmented cams 111.

Figure 15:
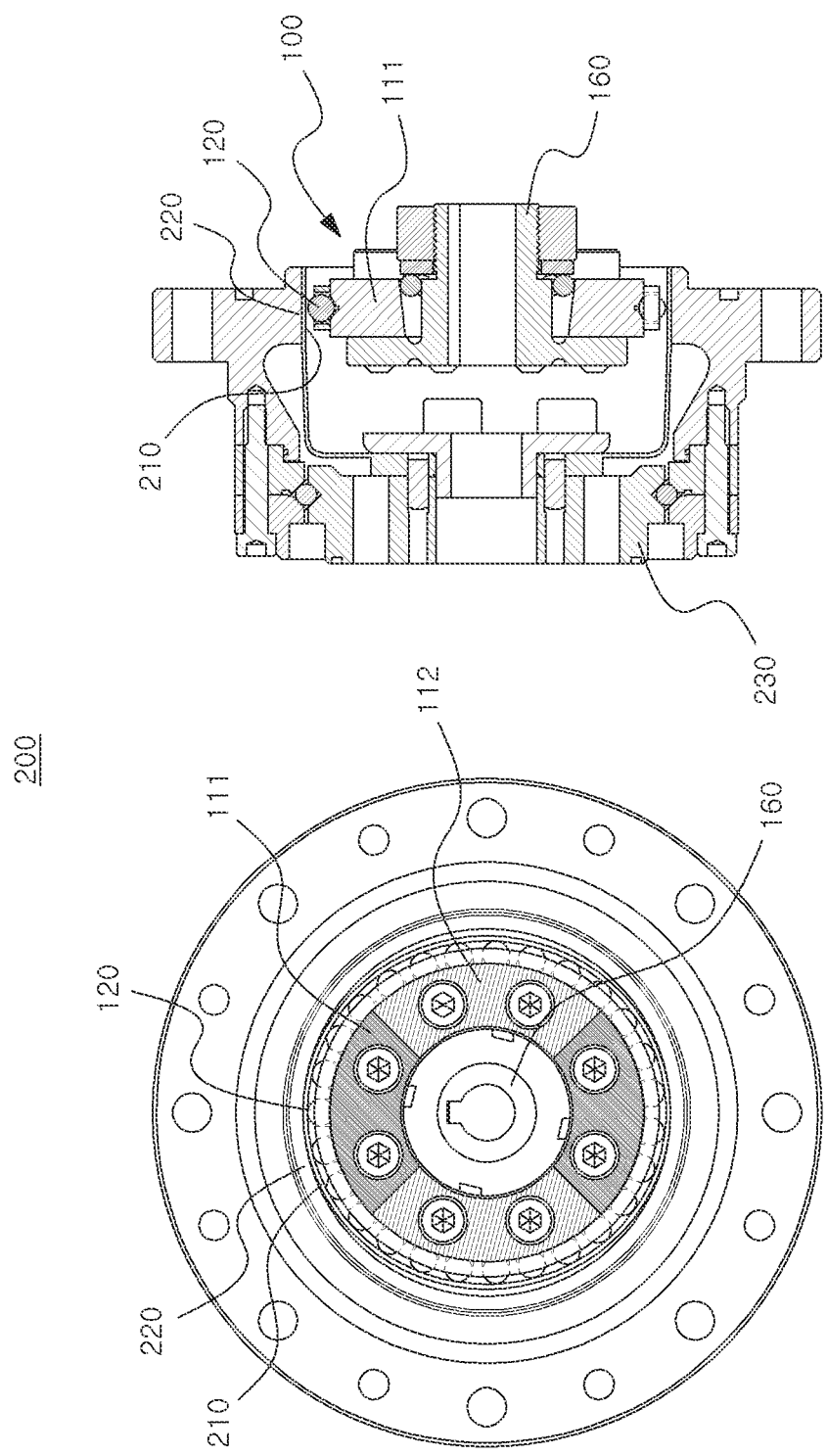
FIG. 15 shows a front view and a sectional view of the toothless harmonic reducer to which the strain wave generator of FIG. 3 is applied.

FIG. 15 is a toothless harmonic reducer 200 to which the strain wave generator 100 of FIGS. 3 and 10 is applied. In this case, a flexspline 210 rotate in reverse according to a diameter difference while being moved in rolling on an inner circumference surface of a circular spline 220, thereby rotating a driven shaft 230 in a large reduction ratio compared to a drive shaft (that is, a central shaft 160).

Figure 16:
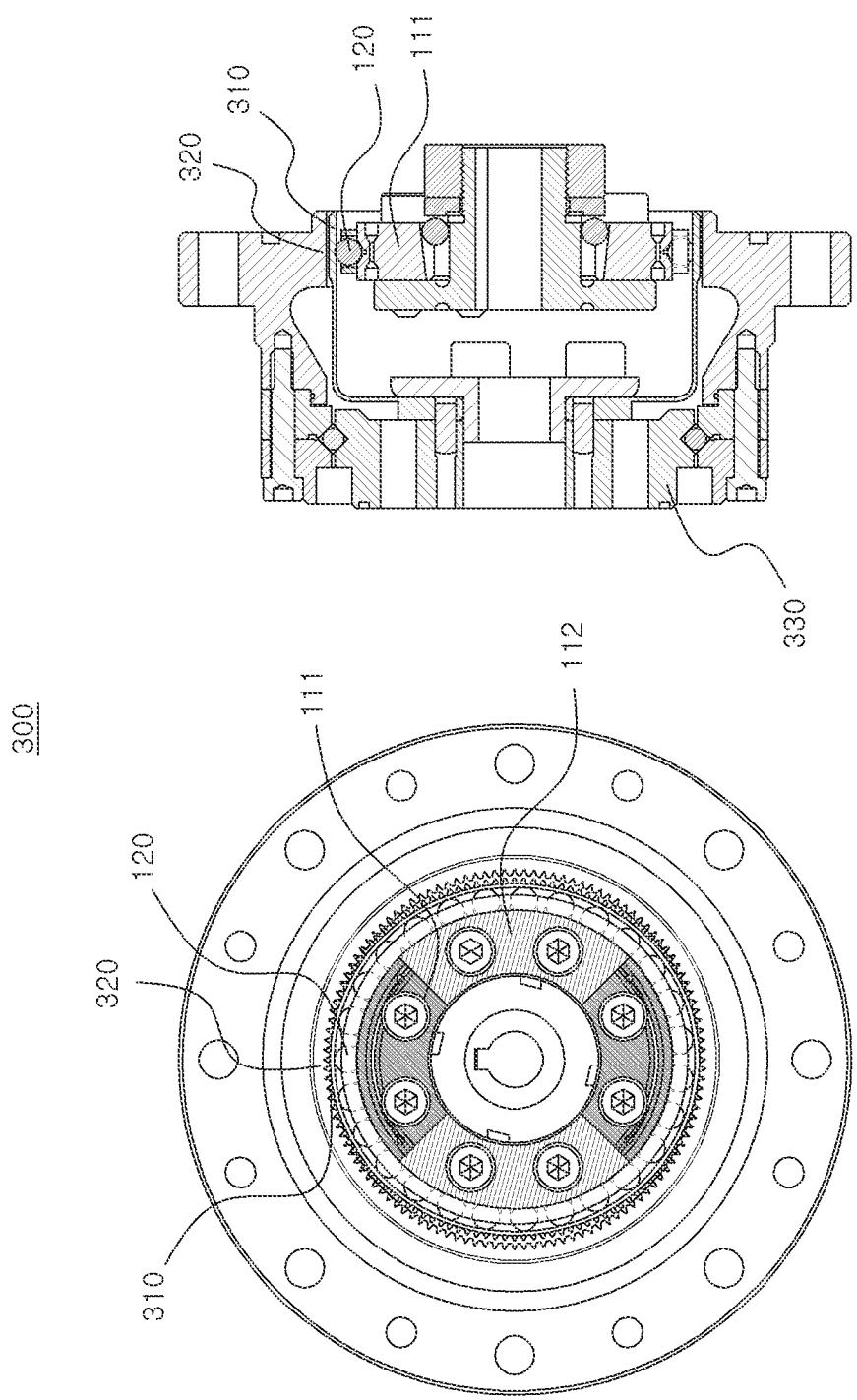
FIG. 16 shows a front view and a sectional view of the toothed harmonic reducer to which the strain wave generator of FIG. 12 is applied.

FIG. 16 is a toothed harmonic reducer 300 to which the strain wave generator of FIGS. 12 and 14 is applied. In this case, in a state in which a flex spline 310 is closely meshed with a circular spline 320 by the pressure of the balls 120 on the outer side of the segmented cams 111 and 112, meshed points rotate in reverse by a difference of numbers of teeth while being moved in a circumferential direction, thereby rotating a driven shaft 330 in a large reduction ratio.

On the other hand, the strain wave generator described above is only an embodiment for helping the understanding of the present disclosure, so the scope of the present disclosure defined by the claims to be described below should not be limited by the above description.

What is claimed is:

1. A strain wave generator for a harmonic reducer, the strain wave generator comprising:
    a cam formed with a plurality of segmented cams on along-diameter side and the same number of segmented cams on a short-diameter side alternately abutted along a circumferential direction,
    wherein each of the segmented cams on a long-diameter side has an outer circumference surface of a certain cylindrical surface of a small radius,
    each of the segmented cams on a short-diameter side has an outer circumference surface of a certain cylindrical surface of a large radius, and
    the cylindrical surface of each of the segmented cams on the long-diameter side and the cylindrical surface of each of the segmented cams on the short-diameter side, abutted each other, have a common tangent line at a meeting point thereof.

2. The strain wave generator of claim 1, wherein, on the cylindrical surfaces of the segmented cams on a long-diameter side and the segmented cams on a short-diameter side, V grooves are formed to be connected to each other in the circumferential direction to form a single track, and
    a plurality of balls is seated along the track.

3. The strain wave generator of claim 1, wherein, on the cylindrical surfaces of the segmented cams on a long-diameter side and the segmented cams on a short-diameter side, a plurality of rollers is in rolling contact with the cylindrical surfaces.

4. The strain wave generator of claim 3, wherein, at opposite sides on the cylindrical surface of the segmented cams on a long-diameter side and the segmented cams on a short-diameter side, bather ribs configured to guide the rollers not to deviate from the track are formed to be connected to each other in the circumferential direction to form a single track, and
    the plurality of rollers is seated along the track.

5. The strain wave generator of claim 1, wherein, on the cylindrical surface of the plurality of segmented cams on a long-diameter side and on the cylindrical surface of the plurality of segmented cams on a short-diameter side, one flexible bearing inner ring is coupled, and
- a plurality of balls or rollers is seated on the flexible bearing inner ring.

6. The strain wave generator of claim 5, wherein, on the plurality of balls or rollers, one flexible bearing outer ring is coupled.

7. The strain wave generator of claim 1, wherein, at an inner side of the plurality of segmented cams on a long-diameter side and segmented cams on a short-diameter side, a central shaft is installed,
- between an inner circumference surface of the plurality of segmented cams on a long-diameter side and segmented cams on a short-diameter side and an outer circumference surface of the central shaft, tapered grooves inclined in an axial direction are formed to extend in a circumferential direction,
- a plurality of balls is inserted into the tapered grooves, respectively, and
- by pressing the plurality of balls in the axial direction through a lock nut coupled to an outer circumference surface of the central shaft, positions of the plurality of segmented cams on a long-diameter side and segmented cams on a short-diameter side are finely adjusted outward.

8. The strain wave generator of claim 7, wherein each of the segmented cams on a long-diameter side has a long hole formed to extend in a circumferential direction adjacent to the cylindrical surface thereof and exerts pressing force in a radial direction through an elastic deformation in which a width of the long hole is narrowed by the plurality of balls pressed in the axial direction.

9. The strain wave generator of claim 7, wherein a flange, configured to support the plurality of segmented cams on a long-diameter side and segmented cams on a short-diameter side in the axial direction, is formed to extend in a radial direction from one end of the central shaft, and
- the flange is elastically deformed in the axial direction by the plurality of segmented cams on a long-diameter side and segmented cams on a short-diameter side pressed by the balls,
- thereby preventing excessive force from being transmitted in the radial direction through the plurality of segmented cams on a long-diameter side and segmented cams on a short diameter side.

10. The strain wave generator of claim 1, wherein, at an inner side of the plurality of segmented cams on a long-diameter side and segmented cams on a short-diameter side, a central shaft is installed,
- tapered grooves inclined in an axial direction are formed on inner circumference surfaces of the plurality of segmented cams on a long-diameter side and segmented cams on a short-diameter side, respectively,
- a ball is inserted into each of the tapered grooves, and by pressing the plurality of balls in the axial direction through a lock nut coupled to an outer circumference surface of the central shaft, positions of the plurality of segmented cams on a long-diameter side and segmented cams on a short-diameter side are finely adjusted outward.

* * * * *

UNITED STATES PATENT AND TRADEMARK OFFICE
CERTIFICATE OF CORRECTION

| | | |
|---|---|---|
| PATENT NO. | : 11,754,163 B1 | Page 1 of 1 |
| APPLICATION NO. | : 17/655472 | |
| DATED | : September 12, 2023 | |
| INVENTOR(S) | : Sang Wan Joo | |

It is certified that error appears in the above-identified patent and that said Letters Patent is hereby corrected as shown below:

In the Claims

Column 6 Line 63, In Claim 4, Line 4, the word "bather" should read "barrier"

Signed and Sealed this
Seventeenth Day of October, 2023

Katherine Kelly Vidal
*Director of the United States Patent and Trademark Office*